United States Patent
Morgan-Rottman et al.

(10) Patent No.: US 10,832,112 B2
(45) Date of Patent: Nov. 10, 2020

(54) TAMPER-EVIDENT ITEM AND ITEM VALIDATION SYSTEM AND METHOD

(71) Applicant: BIRDE TECHNOLOGIES LLC, Flower Mound, TX (US)

(72) Inventors: Michal Carrie Morgan-Rottman, Flower Mound, TX (US); Anne Marie Pellerin, Leesburg, FL (US)

(73) Assignee: BIRDE TECHNOLOGIES LLC, Flower Mound, TX (US)

( * ) Notice: Subject to any disclaimer, the term of this patent is extended or adjusted under 35 U.S.C. 154(b) by 0 days.

(21) Appl. No.: 16/627,962

(22) PCT Filed: Jul. 5, 2018

(86) PCT No.: PCT/US2018/040888
§ 371 (c)(1),
(2) Date: Dec. 31, 2019

(87) PCT Pub. No.: WO2019/018134
PCT Pub. Date: Jan. 24, 2019

(65) Prior Publication Data
US 2020/0134410 A1   Apr. 30, 2020

Related U.S. Application Data

(60) Provisional application No. 62/609,151, filed on Dec. 21, 2017, provisional application No. 62/546,537, (Continued)

(51) Int. Cl.
*G06K 19/073*   (2006.01)
*H04W 4/80*   (2018.01)
(Continued)

(52) U.S. Cl.
CPC ........... *G06K 19/073* (2013.01); *G06F 13/42* (2013.01); *G06Q 10/0832* (2013.01); *G06Q 10/0833* (2013.01); *H04W 4/80* (2018.02)

(58) Field of Classification Search
CPC combination set(s) only.
See application file for complete search history.

(56) References Cited

U.S. PATENT DOCUMENTS

| | | |
|---|---|---|
| 6,809,645 B1 | 10/2004 | Mason |
| 8,514,078 B2 * | 8/2013 | Lax ................. G08B 13/19652 340/572.1 |

(Continued)

FOREIGN PATENT DOCUMENTS

EP   0137767 B1   6/1990

OTHER PUBLICATIONS

International Search Report for PCT/US2018/040888 dated Oct. 3, 2018.
Written Opinion for PCT/US2018/040888 dated Oct. 3, 2018.

*Primary Examiner* — Travis R Hunnings
(74) *Attorney, Agent, or Firm* — Sandberg Phoenix & von Gontard, P.C.

(57) ABSTRACT

A tamper sensing element is provided which can be applied to a product having a housing or casing with a critical area where the housing or casing can be opened or separated at or along a critical area. The tamper sensing element is operable to determine if the housing or casing has been opened or separated at or along the critical area. The tamper sensing element comprises a sensor for detecting a change in a monitored parameter indicative of the housing or casing having been opened or separated at or along the critical area, a memory for storing product data and tag data; a circuit for updating the memory upon detection of a change in the parameter monitored by the sensor; and means for transmitting information contained in the memory upon being que- (Continued)

ried by a scanning device. Also disclosed is a system and method for use at security check points for scanning/screening products provided with the tamper sensing element so that a security official/screener can readily determine if a product has potentially been tampered with.

23 Claims, 6 Drawing Sheets

Related U.S. Application Data filed on Aug. 16, 2017, provisional application No. 62/534,392, filed on Jul. 19, 2017.

(51) Int. Cl.
*G06F 13/42* (2006.01)
*G06Q 10/08* (2012.01)

(56) References Cited

U.S. PATENT DOCUMENTS

| | | | |
|---|---|---|---|
| 9,007,182 B2* | 4/2015 | Cruzado | G06K 19/073 340/10.5 |
| 2005/0039040 A1 | 2/2005 | Ransom et al. | |
| 2005/0242950 A1 | 11/2005 | Lindsay et al. | |
| 2014/0077928 A1 | 3/2014 | Markel et al. | |
| 2015/0254677 A1* | 9/2015 | Huxham | G06F 21/10 705/57 |
| 2017/0330066 A1* | 11/2017 | Gibson | G06K 19/0672 |

* cited by examiner

| Tamper Indicator Data | Tamper Sensing Element Unique Identifier | Scan Date | Scan Location | Product Manufacturer | Product Model Number | Product Serial Number |
|---|---|---|---|---|---|---|

{16a: columns 1-4} {16b: columns 5-7}

FIG 4

TAMPER-EVIDENT ITEM AND ITEM VALIDATION SYSTEM AND METHOD

CROSS-REFERENCE TO RELATED APPLICATIONS

The present application is the U.S. National Stage under 35 U.S.C. § 371 of International Application No. PCT/US2018/040888, filed Jul. 5, 2018 which claims priority to U.S. App. No. 62/534,392 filed Jul. 19, 2017 which is titled "Secure Tamper Evident Personal Electronic Device", U.S. App. No. 62/546,537 filed Aug. 16, 2017 which is entitled "Secure Tamper Evident Personal Electronic Devices, Personal Electronic Device Components, Medical Devices, Footwear, and Liquid Containers," and U.S. App. No. 62/609,151 filed Dec. 21, 2017 which is entitled "Tamper-Evident Item And Item Validation System And Method." All of said applications are incorporated herein by reference.

BACKGROUND

This invention relates generally to tamper sensing elements which can be incorporated into consumer products (such as, personal electronic devices (PEDs), PED components, medical devices, footwear, liquid containers, and other commonly carried or transported items) either during or after manufacture of the item and which can indicate if the consumer product has been tampered with. The invention also relates generally to a system for screening products provided with the tamper sensing elements to allow for ready identification of potential tampering with the products, and, in particular, if the products may have been opened or separated in a manner that could allow for tampering with internal components of the products or attempts to conceal material in the products.

The global terrorist threat to transportation and other key infrastructure and facilities has rapidly evolved since the late-1990's. Global commerce requires open transportation and infrastructure systems that allow for easy access to those needing to use such systems and facilities. These user populations are diverse, including millions of workers and support personnel and billions of people who utilize and rely on transportation and infrastructure services annually.

The openness of most modern-day societies has supported rapid globalization, but that openness also makes these societies vulnerable to a range of rapidly evolving threats. Nowhere is this exposure more significant than in aviation operating systems, and more specifically, aboard passenger aircraft operating globally. One significant threat to the transportation sector is the use of personal electronic devices or PEDs (i.e. laptops, tablets, smartphones, game systems, music playing devices, and other similar devices), and PED components (i.e. batteries, external or removable hard drives, external CD/DVD drives, flash drives, and other similar components). Such devices can be used to hide illicit material that can be used in an Improvised Explosive Device (IED) which can be difficult to detect using current standard security technology and which can be used in an attempt to bring down aircraft, or to attack transportation systems or other key infrastructure or venues (such as courthouses, border stations, or any other venue where screening of products may be desirable). Other products such as footwear and medical devices can also be used to conceal such illicit items. Further, travelers have been banned from carrying liquid containers (of more than 3 oz.) through security checkpoints at airports, again, because the liquid containers can be used to transport illicit material. National governments, in addition to air carriers and airport operators, local and state governments, and private infrastructure operators have placed significant emphasis on continually improving detection capabilities to counter these threats.

In the current transportation security environment, items, such as, PEDs, PED components, medical devices (including prosthetics), footwear, liquid containers, and other commonly carried items belonging to passengers wishing to carry them aboard departing aircraft are screened at a security checkpoint prior to departure. Similar screening is commonplace in other secure venues such as courthouses and local, state, and federal buildings, sporting stadiums, and secure border locations. Most commonly, screening relies on traditional x-ray technology, but other equivalent detection technologies exist and are also used. In addition, operators are exploring the possibility of using Computed Tomography (CT) screening technologies, but the roll-out of these systems could last a decade and could be limited based on their cost. While existing and available screening systems and technologies differ in level of sophistication and capability, minimum baseline x-ray and detection functionalities are similar across platforms. Individuals and organizations intent on doing harm to transportation systems and key infrastructure are constantly changing their techniques to counter these existing detection capabilities, requiring continued ingenuity and creativity by terrorist organizations in developing solutions that can defeat the security systems employed globally. An increased level of creativity is required on the part of security organizations to counter the threat. More specifically, security operators are challenged to find low-tech, low-cost, rapid, and broadly deployable defense mechanisms.

As terrorist threats have evolved, governments have modified procedures and restrictions to account for new tactics. Restrictions on the carriage of liquids in transportation, additional inspection of footwear in aviation and secure infrastructure environments, and an increased focus on prosthetics and other medical devices has impacted how these items are screened and searched in various environments. In March 2017, the United States and Great Britain barred passengers traveling through airports in 10 countries in the Middle East and North Africa from carrying laptop computers and other personal electronic devices larger than cell phones aboard direct inbound flights. In May 2017, the U.S. Department of Homeland Security (DHS) announced it was considering extending the ban to flights from Europe into the United States. In June 2017, DHS required airlines operating from numerous last-point-of-departure airports to implement enhanced measures for screening PEDs, noting that airlines and/or airports unable to meet the requirements could be subject to a full laptop ban. The airline industry estimates that a full PED ban could cost travelers and airlines more than US$3.3 billion per year in addition to costs already incurred for enhanced screening of certain items. Such costs would grow exponentially if foreign countries reciprocate by also banning PEDs and requiring additional scrutiny or restriction of medical devices, liquids, and footwear on flights inbound to the United States, the United Kingdom, or other countries that are enforcing a ban on electronics.

Compounding the challenge are additional safety hazards that occur from the carriage of certain otherwise legitimate items in the cargo hold of commercial passenger aircraft. Many PEDs use lithium batteries, which can pose a safety risk when grouped together and subjected to certain conditions. If PEDs are banned in the cabin of aircraft, considerations will have to be made by U.S. and foreign regulatory authorities as to the risks associated with placing them elsewhere in the aircraft. On Oct. 20, 2017, the United States Federal Aviation Administration suggested additional restriction of the carriage of electronics in the cargo hold of aircraft due to safety concerns.

The screening of cargo (both at the individual parcel level and pallet level) raises concerns similar to the concerns of personal items carried on board a plane. In October 2010, the United States and European Union implemented additional restrictions around cargo being carried on cargo and passenger aircraft after a plot was uncovered that used printer cartridges to conceal explosives.

As can be seen, there is a need to improve the screening of cargo and personal items (such as, PEDs, PED components, medical devices, footwear, liquid containers, and other items) commonly carried by travelers and companies on air carriers, in secure buildings and infrastructure, across secure borders, and those using other modes of transport or gaining access to secure areas.

SUMMARY

A tamper sensing element is disclosed which can be included in (or on) a product, which can help determine if the product might have been tampered with, and thus, if the product needs to undergo additional screening at a security checkpoint. A method for securing the tamper sensing element to the product and activating the product is also disclosed, as is a method for scanning the product with the tamper sensing element at a security check point.

Briefly stated, a tamper sensing element is provided for a product having a housing or casing having a critical area at or along which the housing or casing can be opened or separated. The tamper sensing element is operable to determine if the housing or casing has been opened or separated at or along the critical area. The tamper sensing element comprises a sensor for detecting a change in a monitored parameter indicative of the housing or casing having been opened or separated at or along the critical area, a memory for storing product data and tag data; a circuit for updating the memory upon detection of a change in the parameter monitored by the sensor, and means for transmitting information contained in the memory upon being queried by a scanning device.

The product can be a consumer product, a medical product, a liquid container, a cargo container, a cargo pallet, or a parcel of cargo. Consumer products can include items such as electronic devices, electronic device components, footwear, etc. Liquid containers can include items such as plastic or glass beverage bottles with twist caps, or corked bottles. Medical products include items such as prosthetics. As can be appreciated, this list of products is not limiting.

The environmental parameter monitored includes light exposure, pressure, tearing, stretching, IR exposure, breakage, differentiation or changes in spacing between components in the product or between portions of the housing/casing, etc. In certain circumstances it may be desirable to have two or more sensors which detect two or more of the noted parameters.

The means for transmitting information from the tamper sensing element comprises a data port to which a cable can be connected or a wireless transmitter. Similarly, the tamper sensing element includes means (in the form of the data port or a wireless receiver) to receive information. If a wireless transmitter/receiver is used, wireless transmitter/receiver can utilize Near field Communications, Wi-Fi, Bluetooth, or RFID protocols. Any other desired wireless protocol can be used. If the transmitting/receiving means is wired, the wired connection can utilize USB, Ethernet, SPI, CANBUS, firewire, or RS-232 protocols. Any other wired protocol can be used as well.

The tag data stored in the memory includes tamper indicator data (which indicates if the product housing has been opened at or along the critical area), a serial number for the tamper sensing element, and scan date/time/location data. The tamper indicator data can be a bit having a first value and a second value, wherein the value of the bit is changed from the first value to the second value upon the sensor detecting a change in the monitored parameter(s).

The product data includes the product manufacturer, the product model number, the product serial number, and any other information that may be relevant to identifying the particular product.

In accordance with an aspect of the tamper sensing element, that tag data can also include journey data such as date, time, and location data for the product at selected times. This can include the date, time, and location of the product when the sensor determines a change in the sensed parameter(s), and/or the date, time, and location of the product at selected intervals (i.e., daily) and/or when scanned.

The data can further include consumer data, which can comprise the owner name, owner address, date of purchase by the owner, or any other information which would identify the owner of the product.

Also disclosed is a product having a tamper sensing element as described above. The product comprises a housing or casing having a critical area at or along which the housing or casing can be opened or separated and a tamper sensing element capable of determining if the housing or casing has been opened or separated at or along the critical area. Upon the sensor of the tamper sensing element detecting a change in the monitored parameter(s), the circuit updates information stored in the memory to change the status indicator data from "original" to "altered".

The tamper sensing element can be positioned either internally or externally of the product. When positioned externally of the product, the tamper sensing element is positioned to extend across the critical area.

A system is also disclosed for a product with the tamper sensing element at a security scanning checkpoint. The system comprises the product with the tamper sensing element as described above, a remote database containing tag data and product data corresponding to the tag data and product data stored on the tamper sensing element; and a scanning device adapted to communicate with the tamper sensing element to receive from the tamper sensing element the tamper indicator data, the product data, and the tag data and to communicate with the database to retrieve from the database a data record corresponding to the product data and tag data of a scanned product. The scanning device comprises an indicator to provide a visual, auditory, or tactile indication as to the status of the tamper sensing element (which will indicate if the product has been opened at or along the critical area or if the product has potentially been tampered with). To this end, the scanning device is adapted to evaluate the value of the tamper indicator data to determine if the housing or casing of the product has been opened or separated at or along the critical area, and to compare the tag data and product data stored on the tamper sensing element with the corresponding tag data and product data stored in the database to determine if the product has potentially been tampered with.

If (a) the value of the tamper indicator data indicates that the housing or casing has not been separated or opened at or along he critical area, and if (b) the tag data and product data stored on the tamper sensing element is identical to the tag data and product data stored in the database, then the scanner activates the indicator to provide an indication that the product has cleared scanning.

On the other hand, if (a) the value of the tamper indicator data indicates that the housing or casing has been separated or opened at or along the critical area, or if (b) the tag data and product data stored on the tamper sensing element is not identical to the tag data and product data stored in the database, then the scanner activates the indicator to provide an indication that the product requires additional screening.

Lastly, a method is disclosed for scanning a tamper evident product at a security screening checkpoint. The method includes:

reading with a scanner the tamper indicator data, the product data, and the tag data stored on the tamper sensing element;

accessing the data record of the remote database containing product data and tag data corresponding to the scanned product;

electronically evaluating the value of the tamper indicator data to determine if the housing or casing of the product has been opened or separated at or along the critical area;

electronically comparing the tag data and product data stored on the tamper sensing element with the tag data and product data stored in the remote database; and activating an indicator on the scanner to provide a "go" signal (a) if the value of the tamper indicator data indicates that the housing or casing has not been separated or opened at or along the critical area and (b) if the tag data and product data stored on the tamper sensing element is identical to the tag data and product data stored in the database, and activating the indicator on the scanner to provide a "no go" signal (a) if the value of the tamper indicator data indicates that the housing or casing has been separated or opened at or along the critical area or (b) if the tag data and product data stored on the tamper sensing element is not identical to the tag data and product data stored in the database.

The "go" and "no go" are visual, tactile, and/or auditory signals. If the signals are visual, then preferably the "go" signal is a first color and the "no go" signal is a second color distinct from the first color.

The method can also include a step of updating the memory in the tamper sensing element and the database record with the data, time, status of indicator and/or location of the scanning.

BRIEF DESCRIPTION OF THE FIGURES

The detailed description of some embodiments of the invention is made below with reference to the accompanying figures, wherein like numerals represent corresponding parts of the figures.

FIG. 4 is schematically shows a record of data stored in the memory of the tamper sensing element and in the database;

DETAILED DESCRIPTION

Figure 1:
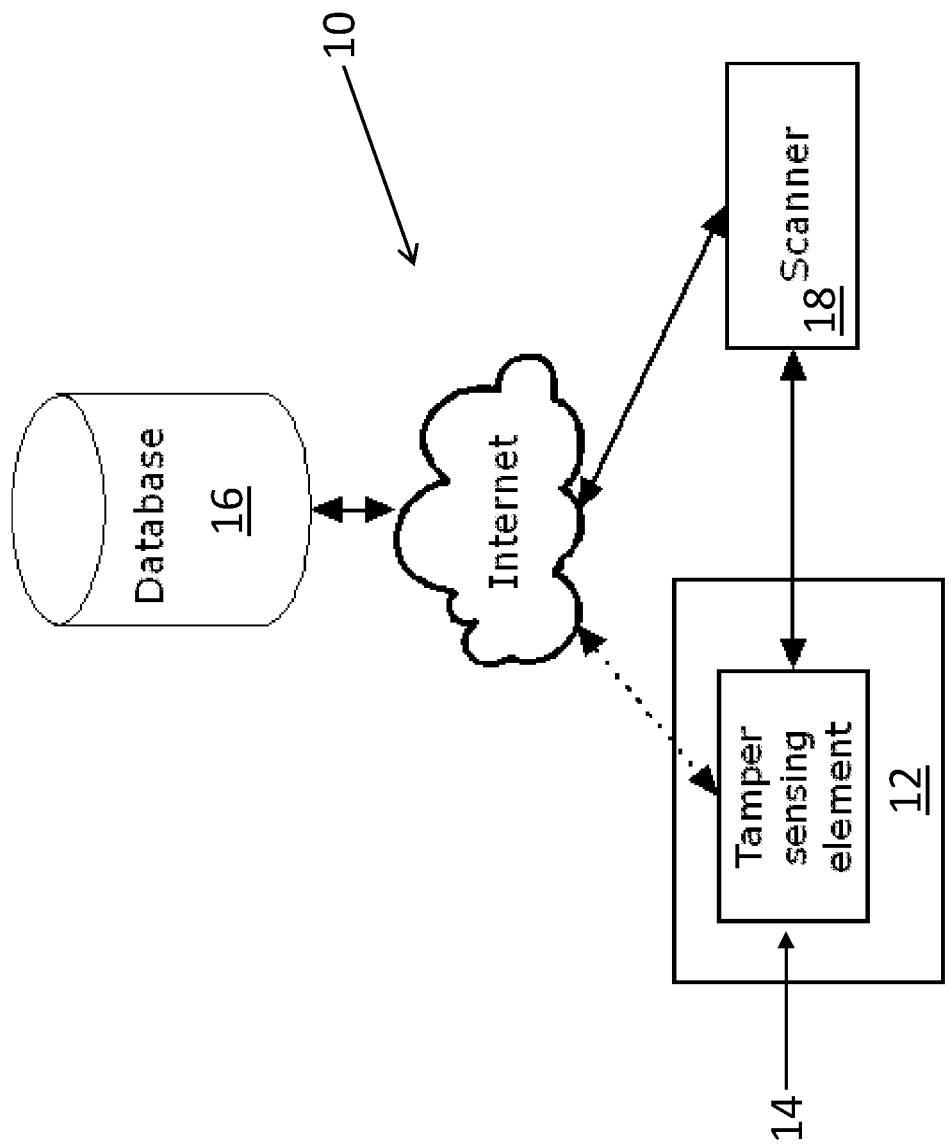
FIG. 1 is a schematic diagram of a product tamper sensing system.

The following detailed description illustrates the claimed invention by way of example and not by way of limitation. This description will clearly enable one skilled in the art to make and use the claimed invention, and describes several embodiments, adaptations, variations, alternatives and uses of the claimed invention, including what we presently believe is the best mode of carrying out the claimed invention. Additionally, it is to be understood that the claimed invention is not limited in its application to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting.

The ability of scanning technologies and equipment operators to identify threats is generally limited to the capability of the scanning equipment itself, coupled with the security personnel's ability to detect the threat item through visual inspection. Historically, the product being scanned has no impact, in its own right, on the probability of alerting security personnel of the fact that an explosive, contraband, or other illicit material has been inserted into the product. The technology described herein can provide a clear, verifiable, mechanism to determine whether a consumer product (such as a PED, PED component, medical device, footwear, liquid container, or other commonly carried item) or cargo has been opened or separated such that internal tampering with the product or cargo may have occurred. The technology complements the scanning technology and operator capabilities that are currently in use in the transportation security and secure infrastructure environment globally. In general, the disclosed technology provides a system for scanning tamper evident items that alerts security screeners that a product or cargo may have been tampered with. Screening efforts in the transportation security and secure infrastructure domain of consumer items (such as PEDs, PED components, medical devices, footwear, liquid containers, and/or other commonly carried items) or cargo are currently limited to the capabilities of the screening personnel and equipment used by governments and transportation operators. Focusing on securing the item itself, independently of the scanning process and associated technology, provides for the opportunity to expand the list of threat counter-measures available to operators. Specifically, transportation security and secure infrastructure operators can greatly enhance overall detection capability by incorporating machine readable/query-able tamper sensing elements into the product itself, which can then be verified during scanning by allowing for one or two factor validation and which can notify screeners of potential tampering with the product or cargo.

FIG. 1 shows the product tamper sensing system 10 diagrammatically. The system 10 includes a consumer product or cargo 12 provided with a tamper sensing element or tag 14. Cargo will include items such as suitcases, pallets of product, and shipping containers which are intended to be transported in the cargo hold of an airplane, ship, train, etc. As described more fully below, the tamper sensing element/ tag 14 carries data regarding both the product or cargo 12 (product data) and the tag 14 (tag data). This information, which is preferably encrypted on the tag 14, is also stored in a remote database 16. The information on the tag 14 is read by a scanner 18 which is in communication with the database 16. The scanner 18 reads the tag data to determine if the product has been opened. Additionally, the scanner communicates with the database to compare the product data and additional tag data with the corresponding information contained in the database 16. This comparison will provide further indication as to the state of the product (i.e., whether or not it has been tampered with) and whether or not the tag is an authentic tag. Based on the tag data and the comparison of the tag data and the product data with the corresponding data stored in the database, the scanner provides a go/no-go indication as to the authenticity of the tag and whether or not the product has potentially been tampered with. If the tag is authentic and the data from the tag shows that the product has not been tampered with, the product 12 is presumed to not have been tampered with. If, on the other hand, the data shows that the product has been opened or that the tag is not an authentic tag, then the product is presumed to have been tampered with, and a signal is provided by the scanner that the product requires further screening. The use of the tag data and the product data to determine if the product has potentially been tampered constitutes two-factor validation or testing of the product.

Communication between the tamper sensing element/tag 14 and the scanner 18 can be wired or wireless. Preferably, the communication is wireless. If wireless, then any standard wireless communication protocol now known or later developed can be used. Such protocols include, for example, Near Field Communications standards, Wi-Fi standards, Bluetooth standards, RFID standards, RF (radio frequency) or other proprietary or non-proprietary standards particular to the tamper sensing element. The wireless communication between the scanner and the database can occur over a local area network (LAN) or a wide area network (WAN). Wired communication is also possible. In this instance, the sensor/ indicator will include a port to which a cable from the scanner can be connected. Wired standards include via USB, Ethernet, SPI, CANBUS, firewire, RS-232, or any other wired standard currently known or later developed.

Figure 2:
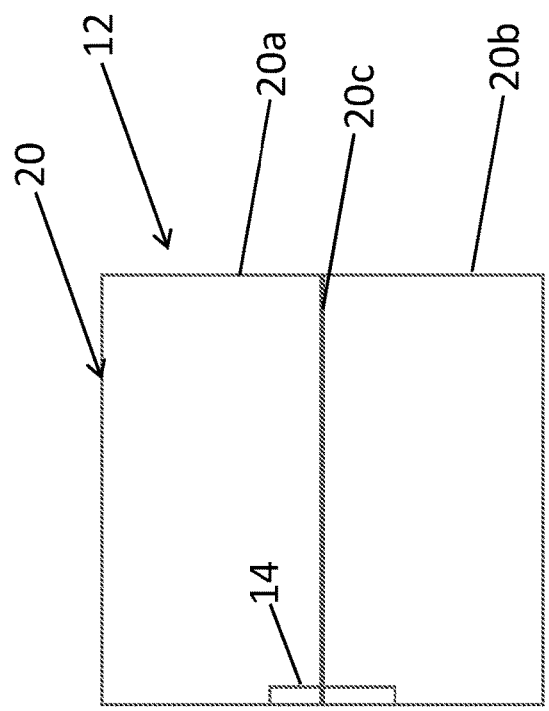
FIG. 2 is a schematic representation of a consumer product with a tamper sensing element/tag.

The product 12 is shown schematically in FIG. 2. The product 12, broadly stated, has an outer housing or casing 20 which has a critical area 20c which can be monitored to determine if the product is opened or separated at or along the critical area. In many consumer products, the housing is comprised of at least two pieces 20a, 20b, and the critical area 20c is a seam or junction where the two pieces meet. For example, if the product 12 is an electronic device, then the two pieces 20a,b of the housing 20 include the two shell parts which commonly encase the internal components of the electronic device, and the critical area 20c is the junction between the clam shell parts. If the product is a shoe, then the housing pieces 20a,b can, for example, be the shoe upper and the shoe sole, with the critical area 20c being the junction between the shoe upper and sole. The critical area in a shoe could also be the junction between the shoe sole and the shoe heel, or between sections of the shoe heel. If the product is a beverage container (such as a capped or corked bottle), then the critical area 20c will be the junction between the cap or cork and the neck of the bottle. In the case of a cap with a breakable ring (such as is common on plastic beverage bottles, such as soda or water bottles), the seam can be the junction between the cap and its ring. In the case of a glass bottle with a removable cork surrounded by a seal, the critical area can be the connection between the cork and the seal. The product can also be a cargo or shipping container or a cargo pallet. In the case of a shipping or cargo container, the critical area 20c corresponds to the juncture between the cargo container and a door/lid to the cargo container or other areas of the cargo container which may reasonably be expected to be separated to gain access to the interior of the cargo container. In the case of a cargo pallet (in which product on the pallet is typically wrapped in plastic), the critical area 20c corresponds to the integrity of the external wrapping.

Figure 3A:
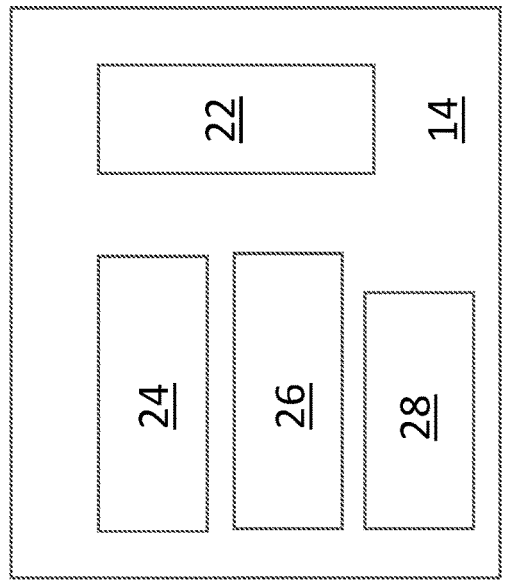
FIGS. 3A and 3B are block diagrams of the tamper sensing element and of a scanning device, respectively, of the product tamper sensing system.

The tamper sensing element/tag 14 is shown diagrammatically in FIG. 3A. The tamper sensing element/tag 14 includes a sensor 22 of a type which will sense a parameter indicative of the product having been opened or separated at the critical area 20c, a transmitter/receiver or data port 24 which will allow the tamper sensing element/tag 14 to communicate with the scanner 18, a memory 26 which stores the product information and tag information, and, if necessary, a power source 28. If the product 12 is an electrical product (i.e., a product with its own power supply), then the power source 28 can be the power supply of the product 12 (in which case, the tamper sensing element/ tag 14 is part of the product's electrical circuit). On the other hand, if the consumer product is a shoe, beverage bottle, cargo container, cargo pallet, or other non-electrical product, then the power source 28 will need to be a battery, capacitor, or other power storage device that is part of the tamper sensing element 14. A tamper sensing element 14 with its own power supply may be more desirable for after-market tamper sensing elements which are secured to products by, or on behalf of, consumers, and subsequent to the manufacture and purchase of the product.

The sensor 22, as noted, is responsive to a parameter or condition that, based on the sensor's location on or in the product 12, will be indicative of the product being opened or separated along or at the critical area. For example, the sensor 22 can be one which detects changes in light, pressure (i.e., stretch or tearing), or temperature. Additionally, the sensor can be one which detects gases that may result from attempts to install an IED in the product. If the tamper sensing element/tag 14 is to be located internally of the product, then the sensor 22 can be selected to detect changes in, for example, light or pressure If the tamper sensing element/tag 14 is to be located on an external surface of the product, then the sensor 22 can be responsive to changes in, for example, pressure (i.e., responsive to stretching or tearing) or to changes distance between the internal components of an item, device, or piece of cargo. Other parameters include IR exposure, breakage, or differentiation or changes in spacing between components in the product or between portions of the housing/casing, etc. In certain circumstances it may be desirable to have two or more sensors which detect two or more of the noted parameters. The tamper sensing element 14 can be incorporated into the product 12 during manufacture, or it can be provided as an after-market item which is secured to the product after manufacture (for example, by a distributor). For example, the tamper sensing element can be adhered to the product by means of adhesive. In either instance, the tamper sensing element 14 can be internal or external of the product. The position of the tamper sensing element 14 on the product will be dictated in large part by the type of sensor employed by the tamper sensing element 14. If the sensor 22 is one that detects light, then the tamper sensing element will need to be located internally of the device. If the tamper sensing element detects pressure, stretching, or changes in distance between product components, then the tamper sensing element can be located either internally or externally of the device, but may need to extend across the critical area 20c (so that the pressure, stretching, or change in distance caused by opening of the housing 20 can be detected).

The construction of the tamper sensing element 14 will also depend in part on the type of sensor incorporated into the tamper sensing element. If the tamper sensing element 14 detects stretching or tearing, for example, then the tamper sensing element can comprise a base made of a stretchable tape, which would extend across the critical area 20c of the product. In the case of an electronic device, for example, the tamper sensing element would form a seal at least along a portion of the junction between the two sections of the housing for the electronic device. If the tamper sensing element detects changes in distance between two parts of the product or between two locations of the product housing, then the tamper sensing element can include at least two or more discrete members or two or more discrete sensors which are adapted to monitor the distance between the members or their respective locations.

Figure 3B:
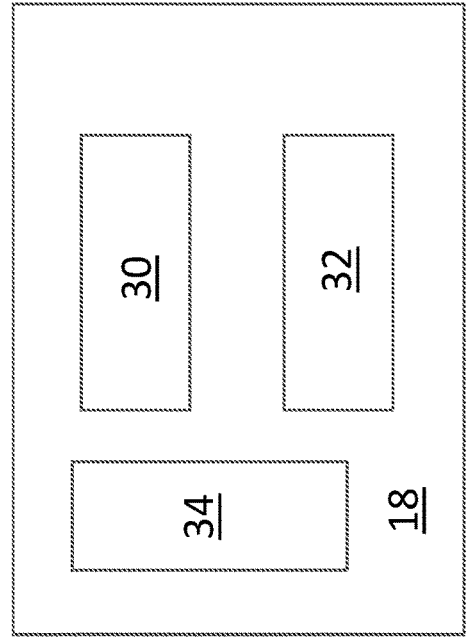

The scanner 18 is shown schematically in FIG. 3B. The scanner includes a transmitter/receiver 30 which allows for communication with the transmitter/receiver 24 of the tamper sensing element/tag 14 and with the remote database 16, an indicator 32 which will provide the operator with a go/no-go indication based on the scanning of the product 12, and a processor 34. The processor 34 is provided with circuitry and/or programming to enable the scanner 18 to receive the data stored in the memory of the tamper sensing element/tag 14 and the corresponding data stored in the database 16, to decrypt the encrypted data from both the tamper sensing element/tag 14 and the database 16, to check the value of the tamper indicator data (discussed below), to perform a comparison of the data from the tamper sensing element/tag 14 with the corresponding data from the database 16, and to activate the indicator 32 to provide the appropriate go/no-go signal. Preferably, the indicator 32 provides a visual indication. For example, the indicator can be a multi-colored LED or multiple LEDs of different colors, and the color of the LED(s) will be dependent upon go/no-go determination. For example, the LED(s) can be green for "go" determination, and red for "no-go" determination. Alternatively, the indicator 32 can provide an audible or tactile indication.

FIG. 4 is a representation of the data stored on the memory 26 of the tamper sensing element/tag 14 and which is stored in the database 16 for each tamper sensing element/tag 14. As noted above, the data includes tag data 16a and product data 16b. Tag data includes, for example, tamper indicator data, a serial number for the tamper sensing element, and scan date/time/location data. In addition, the tag data can include journey data which can include the date/time/location when the tamper sensing element is "tripped," that is, when the sensor detects a change in the monitored parameter which indicates that the product has been opened or separated at or along the critical area and/or when the has been scanned. To accomplish this, the tamper sensing element would also need to be provided with a GPS or other location detecting device. Further, the journey data include data relating to the location of the product at selected times. In this instance, the tag memory can be updated with date/time/location information at determined time intervals to allow the journey of the product to be determined. The product data includes, for example, the product manufacturer, the product model number, and the product serial number. In addition, the record can include consumer data which would include, for example, the owner name, address, date of purchase, etc. For enhanced security the data is encrypted on the tag 14 and in the database 16, and is transmitted between the scanner and the database in an encrypted format. The scanner decodes the encrypted data according to a determined encryption algorithm to make the necessary determination as to whether or not the product has potentially been tampered with.

The tamper indicator data can be a single bit which has a value of "0" or "1", and is changed in response to a signal from the sensor generated when the sensor detects a change in the monitored parameter (i.e., when the sensor determines that that the product has been opened). Upon manufacture of the tamper sensing element, the value of the tamper sensing data bit is set to "0" and hence the value of the tamper sensing data bit will be "0" when the tamper sensing element is initially incorporated into the consumer product. A "0" value for the tamper sensing data bit is indicative of an as-manufactured state for the product, or more particularly, that the product has not been opened at its critical area 20c. The sensor 22 continuously monitors the sensed-for condition (i.e., changes light, pressure, change in distance, etc.) Upon sensing a change in the sensed-for condition, circuitry or programming contained on the tamper sensing element will update the tamper sensing data bit, and change it from "0" to "1" to indicate that the consumer product 12 has been opened, or the product's shell parts 20a,b have been at or separated along the critical area 20c. Stated differently, upon the product being opened or separated, the tamper sensing element is tripped, and the value of the tamper indicator data bit is changed. In a variation, if the product 12 is opened (i.e., separated at or along the critical area 20c), the tamper sensing element can communicate with the database 16 to update the database to indicate that that the product has been opened. This would be in addition to changing the value of the tamper indicator data on the tamper sensing element 14.

During a scan of the product 12, the scanner determines the value of the tamper indicator data and compares the tag data and product data that is stored in the memory of the tamper sensing element 14 with the corresponding data for that tag stored in the database 16. As noted above, the value of the tamper indicator data will provide an indication as to whether the product has been opened or separated at or along the critical area. The tag data comparison is used to determine if the tamper sensing element/tag 14 is an authentic tamper sensing element/tag. If the comparison shows that the data stored on the tamper sensing element/tag 14 is the same as the data stored in the database, then the tamper sensing element/tag 14 is determined to be an authentic tamper sensing element/tag. However, if there is a difference in the data, then the tamper sensing element/tag is determined to be counterfeit. Similarly, the comparison of the product data stored on the tamper sensing element and in the database will similarly result in a conclusion as to the authenticity of the tamper sensing element or whether the tamper sensing element has, itself, been tampered with. During a scan, regardless of the value of the tamper sensing data bit, the scanner will generate a "no-go" signal if there is a discrepancy between the tag data or product data on the tamper sensing element/tag and the corresponding data in the database.

The scan date, time and location data serves as a further check regarding the authenticity of the tamper sensing element/tag 14. Each time the product 12 is scanned using a scanner 18, the data on the tamper sensing element/tag 14 will be updated with the time/date and location of the scan. The corresponding information will be uploaded to the database. Thus, each time the consumer product 12 is scanned, the scanner will check to ensure that the scan time/date and location information (which will be the time/date and location of the prior scan) corresponds to the information stored in the database 16. During a scan, regardless of the value of the tamper sensing data bit, the scanner will generate a "no-go" signal if there is a discrepancy between the time/date and location data on the tamper sensing element/tag and the corresponding data in the database, as this would lead to a conclusion that the tag is not an authentic tag.

Figure 5A:
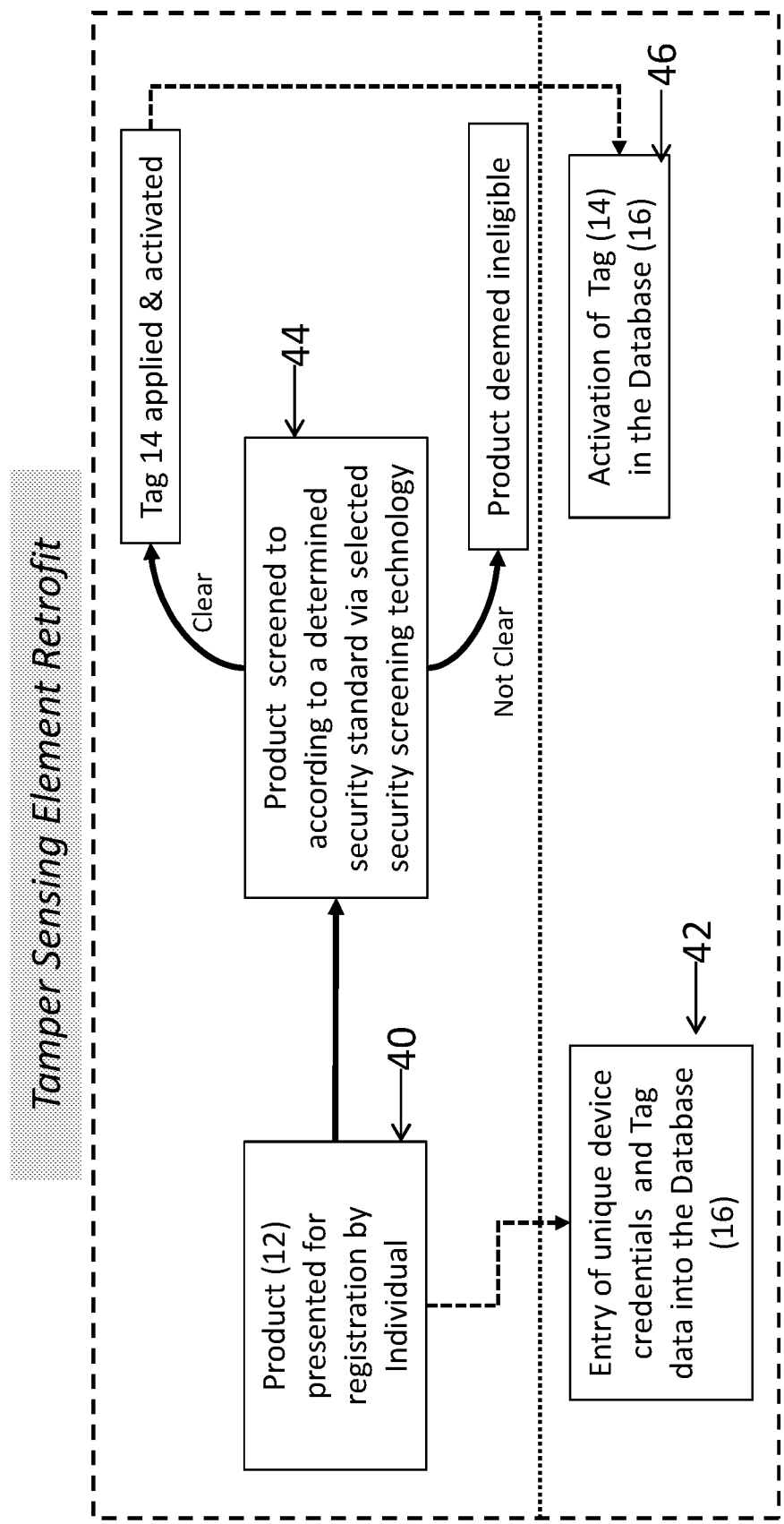
FIG. 5A is a flow chart showing activation of a tamper sensing element for a consumer product which is retrofitted with the tamper sensing element.

As alluded to above, the tamper sensing element can be added to an already produced product (for example, as an after-market addition) or it can be incorporated in the product during manufacture of the product. Adding the tamper sensing element 14 to the product 12 after manufacture (and upon or after purchase by the consumer) is shown in FIG. 5A. As shown in FIG. 5A, the customer, at step 40, presents the product for registration, at which point, the product's credentials, i.e., product data, is uploaded to the database 16. (Step 42) As discussed above, this information can include manufacturer name, the product model number and the product serial number, a unique bill of lading identification number, or other information or unique identifier for the product. The product is also subject to a security screening (Step 44), by, for example, Explosive Trace Detection (ETD), x-ray, Computer Tomography (CT), or any other security screening technology now known or later developed to ensure that the product has not previously been subject to alteration. If the security screening of the product is negative, then the product is eligible for inclusion in the tamper-evident system. The tamper sensing element/tag 14 is activated (at Step 46) and applied to the product in an appropriate position which is dictated by the type of sensor utilized by the tamper sensing element. Activation of the tamper sensing element includes ensuring that the tamper sensing bit is set to "0," and storing initial scan data in the memory of the tamper sensing element. The serial number or other unique identifier for the tamper sensing element is then added to the database in the record for the particular consumer product. It will be appreciated that this same procedure would be utilized in the instance where the product is a cargo pallet or cargo container.

Figure 5B:
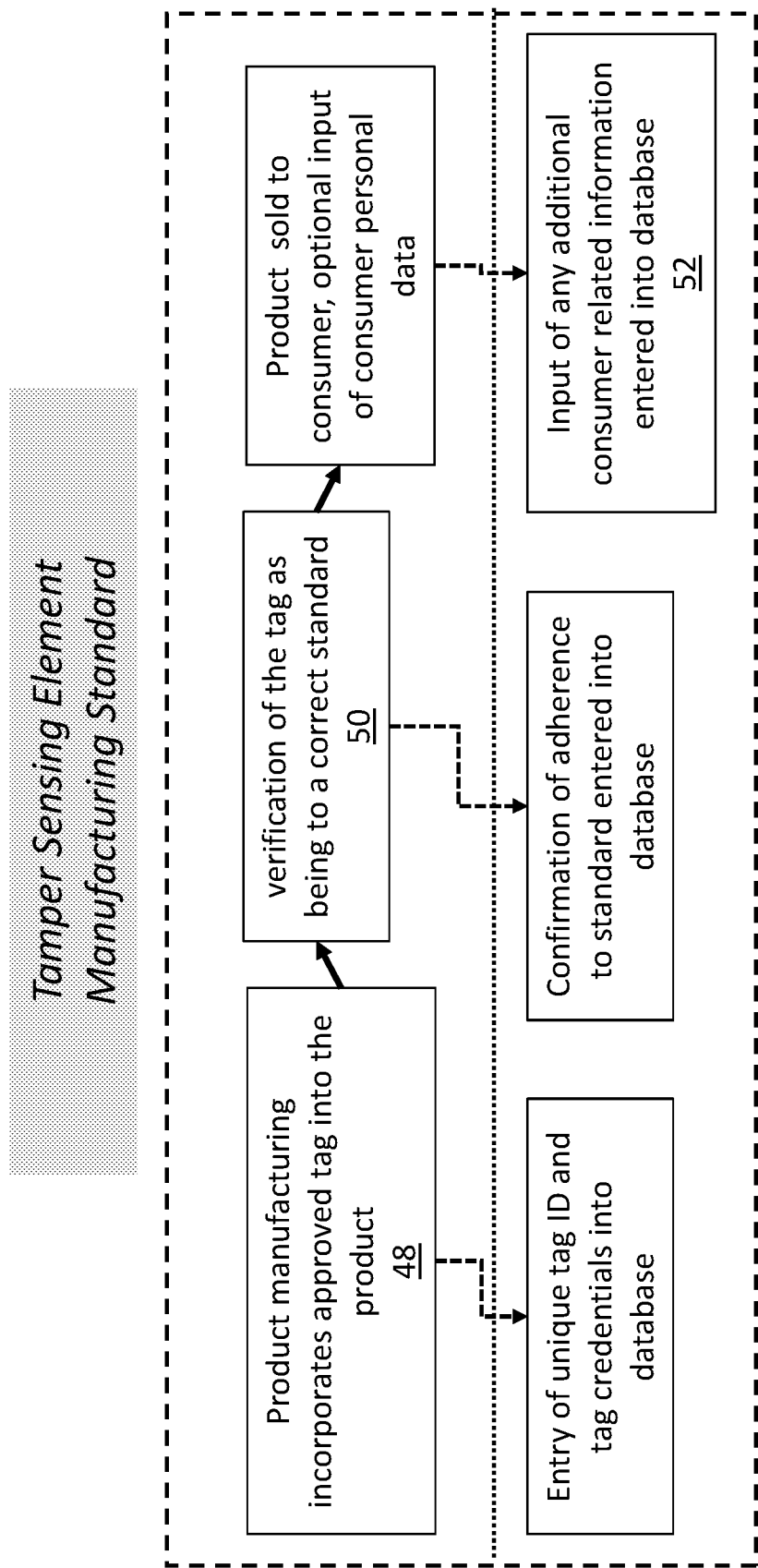
FIG. 5B is a flow chart showing activation of a tamper sensing element for a consumer product which is manufactured with the tamper sensing element.

FIG. 5B shows producing the product with the tamper sensing element. As shown therein, during manufacture of the product, the tamper sensing element/tag 14 is incorporated in the product in a position dictated by the type of product and type of sensor used on the tamper sensing element/tag. (Step 48) The tamper sensing element/tag 14 is verified (at step 50) as being an authentic (as opposed to counterfeit) tag. This can be accomplished by entering into the database the identifying information of the particular tamper sensing element/tag 14. This step is preferably performed prior to incorporation of the tag into the product. The database will pass the entered tag identifying information through a verification/authentication algorithm, and will return a warning if the information entered does not represent an authentic tamper sensing element, at which point, the manufacturer can try to reenter the information to account for any entry errors. Upon confirmation that the tamper sensing element/tag 14 is authentic, the product information is entered into the database to be associated with the tamper sensing element. Upon sale of the tamper evident product to a consumer, the consumer can enter consumer information (name, residence, date of purchase, place of purchase, etc.) into the database to be associated with the tamper evident product. (Step 52).

The procedure for providing a tamper sensing element to a previously produced product (FIG. 5A), as described above, did not include a step of validating the tamper sensing element as occurred in the procedure of FIG. 5B for incorporating the tamper sensing element in a product during manufacture of the product. This validation step can be included when adding the tamper sensing element to an already produced product.

Figure 6:
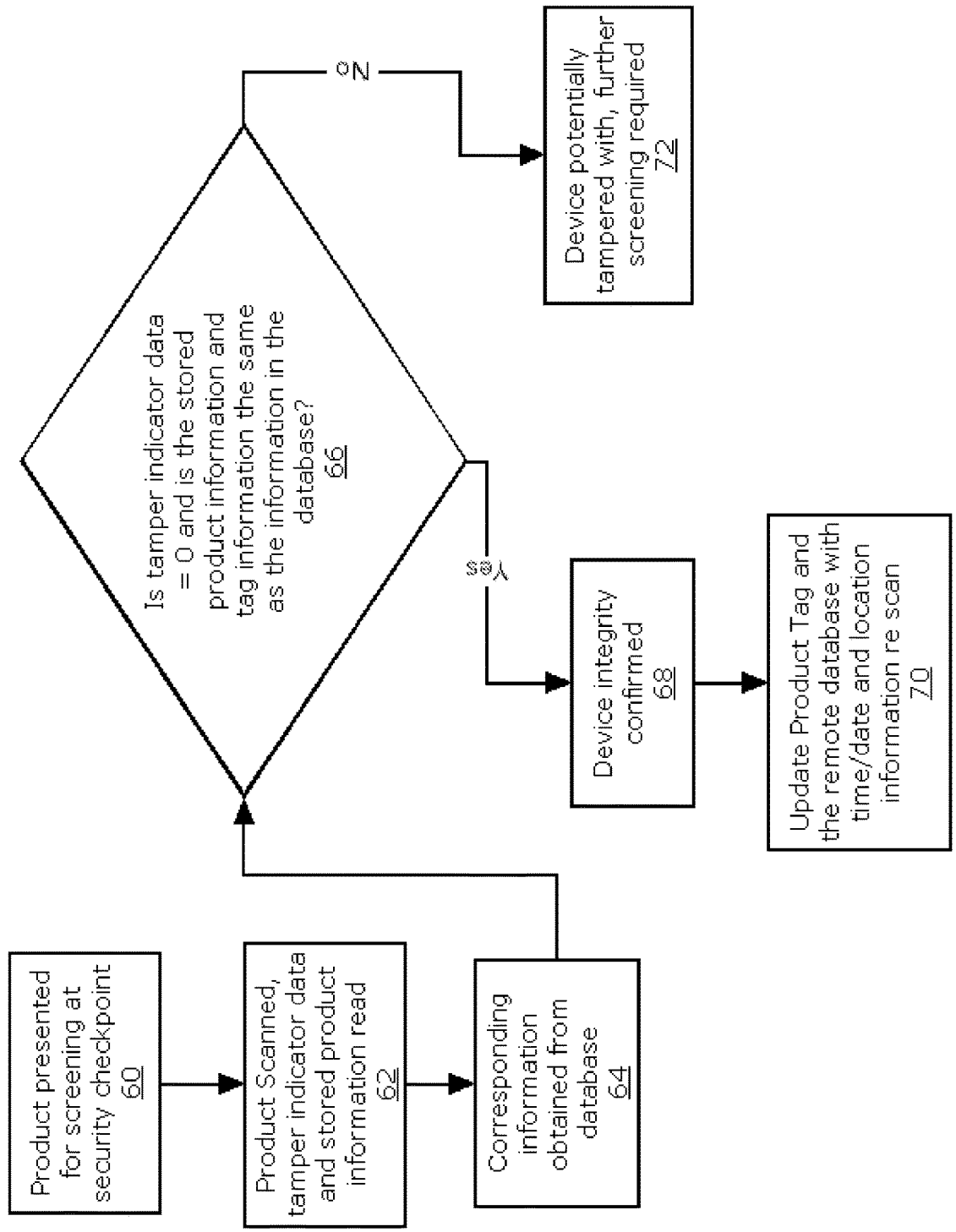
FIG. 6 is a flow chart of the scanning procedure for a tamper evident consumer product provided with the tamper sensing element.

Scanning of the tamper-evident product at a security checkpoint (airport, border crossing station, secure facility entrance, cargo warehouse, etc.) is shown in FIG. 6. As shown therein, the tamper-evident product is presented for scanning (Step 60), at which point the product is scanned with the scanning device (Step 62), and the data stored in memory of the tamper sensing element is read. As noted above, this interrogation/querying of the tamper sensing element can be carried out either wirelessly or over a wired connection between the tamper sensing element and the scanner. Once the product information has been read, the system can then, at Step 64, retrieve the corresponding information from the database 16. At Step 66, the scanner will determine if the value of the tamper sensing data is "0" or "1" to determine if the product was opened. Additionally, the scanner will compare the tag data and product data stored on the tag 14 (which was read at step 62) with the corresponding data stored in the database. If the value of the tamper sensing data is "0" and if the product data and tag data are identical to the product and tag data stored in the remote database, it is determined that the product has not been tampered with, and the product is cleared. (Step 68) The database and the memory of the tamper sensing element are then updated with the date, time, and location of the current scanning. (Step 70). On the other hand, if the value of the tamper sensing data is "1" or if the tag data or product data is not identical to the tag data or product data stored in the remote database, then there is a presumption that the product has been tampered with, and the product is flagged for additional security screening. (Step 72). Upon determining the state of the product, the scanner will notify the operator of the state of the product via the indicator 32. For example, if the product is cleared, the scanner can cause an indicator light to light up as green. On the other hand, if it is detected that the product may have been tampered with, the indicator light can light up as red.

The use of the tamper sensing device is described above generally in conjunction with products, such as consumer products and medical devices. The tamper sensing element can also be utilized with products such as cargo pallets, containers or parcels, as noted above. In this instance, the tamper sensing element will be validated and activated by the manufacturer when the manufacturer loads product into a cargo container. The tamper sensing element is then secured to the cargo container to span the junction between a door of the cargo container and the body of the cargo container, pallet, or parcel.

The tamper sensing device can also be used to allow travelers to carry liquid containers through, for example, an airport security checkpoint which are not otherwise allowed through (i.e., liquid containers with a volume greater than 3 oz). This would be desirable, for example, when a traveler purchases expensive wine at a vineyard while on vacation. In this instance, the tamper sensing element will be validated and activated by the seller when the bottle of wine, for example, is sold to the customer. The tamper sensing element can be secured to the bottle, as described above, at the cap or cork of the bottle.

In these two additional examples, the product would effectively be preapproved prior to application of the tamper sensing element to the product (i.e., the cargo container, pallet, or parcel or the wine bottle). If the product is tampered with after the tamper sensing element is applied (i.e., if the cargo container or wine bottle are opened), the scanning of the tamper sensing element will alert a security official to the fact that the product may have been tampered with.

No current capability exists to determine when the casing or housing of a product has been breached and if the internal components or space exposed, either for legitimate or nefarious purposes. Tamper evident capabilities in PEDs, for example, are largely limited to methods and systems that expose the tampering of data housed within the system. Additionally, legitimate reasons exist to access the internal operating components of these types of electronics. For example, upgrades and repairs often result in the purposeful exposure of the internal operating components of PEDs and their components. Additionally, tamper evident capabilities in medical devices are limited to determinations of expiration of the device or tampering for purposes of quality control of the medical device. Again, there is currently no known way to determine if a device has been opened to expose the interior space or interior components of the device. Our technology and system supports approaches for differentiating between legitimate and nefarious tampering in instances where security operators are acting to understand the nature of the tampering identified.

The system described herein allows organizations and individuals who are responsible for the security of transportation and/or infrastructure globally to have a meaningful and verifiable method of determining whether a scanned product may pose an increased level of threat. By providing the ability to determine whether the casing of the scanned product has been breached and, if breached, whether such breach occurred for legitimate reasons, transportation security, customs agents, and secure infrastructure and facility security organizations can identify whether the product was tampered with in an attempt to disguise illicit materials designed to cause serious damage to individuals or systems or contraband items that are being transported in violation of existing regulations, laws, or policies. This further allows screeners to differentiate and segregate electronics, electronic components, medical devices, footwear, and/or liquid containers based on levels of risk associated with meeting acceptable compliance thresholds. The system accomplishes this through two possible verifiable factors. First, the tamper indicator data provides for the ability of the screening operator to determine whether a product has potentially been altered or tampered with. Second, the comparison of the data stored on the tamper sensing element with the corresponding data stored in the database allows for verification of a potential breach of the tamper sensing element. Currently, no mechanism exists that allows for such validation or verification.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

The invention claimed is:

1. A method for scanning a tamper evident product at a security screening checkpoint;
    a tamper evident product comprising housing or casing having critical area where the housing or casing can be opened or separated and a tamper sensing element capable of determining if the housing or casing has been separated at or along the critical area; wherein the tamper sensing element comprises a sensor for detecting a change in a monitored parameter indicative of the housing or casing having been separated or opened at or along the critical area, a memory for storing tamper indicator data indicative of the a state of the tamper sensing element, product data comprising data identifying the product, and tag data comprising data identifying the tamper sensing element; a circuit for updating the memory upon detection of a change in the parameter monitored by the sensor; and means for transmitting the data contained in the memory upon being queried;
    the method comprising:
    reading with a scanner the tamper indicator data, the product data, and the tag data stored on the tamper sensing element;
    accessing a data record of a remote database containing product data and tag data corresponding to the scanned product;
    electronically evaluating the value of the tamper indicator data to determine if the housing or casing of the product has been opened or separated at or along the critical area;
    electronically comparing the tag data and product data stored on the tamper sensing element with the tag data and product data stored in the remote database; and
    activating an indicator on the scanner to provide a "go" signal (a) if the value of the tamper indicator data indicates that the housing or casing has not been separated or opened at or along he critical area and (b) if the tag data and product data stored on the tamper sensing element is identical to the tag data and product data stored in the database, and
    activating the indicator on the scanner to provide a "no go" signal (a) if the value of the tamper indicator data indicates that the housing or casing has been separated or opened at or along he critical area or (b) if the tag data and product data stored on the tamper sensing element is not identical to the tag data and product data stored in the database.

2. The method of claim 1 wherein the indicator generates a visual, tactile, or auditory signal.

3. The method of claim 2 wherein the indicator generates a visual signal, and the "go" signal is a first color and the "no go" signal is a second color distinct from the first color.

4. The method of claim 1 including a further step of updating the memory in the tamper sensing element and the database record with the data, time, and/or location of the scanning.

5. A system for scanning a tamper evident product at a security scanning checkpoint; the system comprising:
    the tamper evident product; the tamper evident product comprising a housing or casing having critical area where the housing or casing can be opened or separated and a tamper sensing element capable of determining if the housing or casing has been separated at or along the critical area; wherein the tamper sensing element comprises a sensor for detecting a change in a monitored parameter indicative of the housing or casing having been separated or opened at or along the critical area, a memory for storing tamper indicator data indicative of the a state of the tamper sensing element, product data comprising data identifying the product, and tag data comprising data identifying the tamper sensing element; a circuit for updating the memory upon detection of a change in the parameter monitored by the sensor; and means for transmitting the data contained in the memory upon being queried;

a remote database containing tag data and product data corresponding to the tag data and product data stored on the tamper sensing element; and a scanning device adapted to communicate with the tamper sensing element to receive from the tamper sensing element the tamper indicator data, the product data, and the tag data and to communicate with the database to retrieve from the database a data record corresponding to the product data and tag data of a scanned product; the scanning device comprising an indicator to provide a visual, auditory, or tactile indication as to the status of the tamper sensing element; said scanning device is adapted to evaluate the value of the tamper indicator data to determine if the housing or casting of the product has been opened or separated at or along the critical area, and to compare the tag data and product data stored on the tamper sensing element with the corresponding tag data and product data stored in the database;

whereby, (a) if the value of the tamper indicator data indicates that the housing or casing has not been separated or opened at or along he critical area and (b) if the tag data and product data stored on the tamper sensing element is identical to the tag data and product data stored in the database, then the scanner activates the indicator to provide an indication that the product has cleared scanning, and whereby (a) if the value of the tamper indicator data indicates that the housing or casing has been separated or opened at or along he critical area or (b) if the tag data and product data stored on the tamper sensing element is not identical to the tag data and product data stored in the database, then the scanner activates the indicator to provide an indication that the product requires additional screening.

6. A tamper sensing element for a product wherein the product comprises a housing or casing having a critical area where the housing or casing can be opened or separated at or along the critical area; the tamper sensing element being operable to determine if the housing or casing has been opened or separated at or along the critical area; the tamper sensing element comprising:

a sensor operable to detect a change in a monitored parameter indicative of the housing or casing having been opened or separated at or along the critical area;

location detecting means;

a clock;

a memory for storing product data and tag data; the tag data including tamper indicator data and journey data indicative of the location of the product at selected times, the journey data including the data, time, and location of the product when the sensor detects a change in the monitored parameter(s);

a circuit responsive to output from the sensor; the circuit being operable to update product data and/or tag data in the memory upon detection of a change in the parameter monitored by the sensor; and means for transmitting information contained in the memory upon being queried by a scanning device.

7. The tamper sensing element according to claim 6 wherein the product comprises consumer products, medical products, liquid containers, cargo containers, cargo pallets, or parcels of cargo.

8. The tamper sensing element according to claim 6 wherein the consumer products include electronic devices, electronic device components, and footwear.

9. The tamper sensing element according to claim 6 wherein the environmental parameter includes one or more of light, pressure, tearing, stretching, IR, breakage, and differentiation in spacing between components in the product or between portions of the housing/casing.

10. The tamper sensing element according to claim 6 wherein the means for transmitting information comprises a data port to which a cable can be connected or a wireless transmitter.

11. The tamper sensing element of claim 10 wherein the wireless transmitter utilizes Near field Communications, Wi-Fi, Bluetooth, or RFID protocols.

12. The tamper sensing element of claim 10 wherein the wired connection utilizes USB, Ethernet, SPI, CANBUS, firewire, RS-232.

13. The tamper sensing element of claim 6 wherein the tag data further includes a serial number for the tamper sensing element, and scan date/time/location data; and wherein the product data includes the product manufacturer, the product model number, the product serial number.

14. The tamper sensing element of claim 6 wherein the journey data includes data relating to the location of the product at selected times intervals.

15. The tamper sensing element of claim 13 wherein the data further includes consumer data comprising information which identifies the owner of the product; the consumer data including the owner name, owner address, date of purchase of the product.

16. The tamper sensing element of claim 13 wherein the tamper indicator data is a bit having a first value and a second value; the value of said bit being changed from said first value to said second value upon said sensor detecting a change in the monitored parameter(s).

17. A tamper evident product comprising a housing or casing having critical area where the housing or casing can be opened or separated at or along the critical area and a tamper sensing element of claim 6 positioned on or in the product to determine if the housing or casing has been opened or separated at or along the critical area; wherein the tamper sensing element comprises:

where, when said sensor of said tamper sensing element detects a change in the monitored parameter, the circuit updates information stored in the memory to change a status indicator from "original" to "altered".

18. The tamper evident product of claim 17 wherein the product comprises consumer products, medical products, liquid containers, cargo containers, cargo pallets, and cargo parcels.

19. The tamper evident product of claim 18 wherein the consumer products include electronic devices, electronic device components, and footwear.

20. The tamper evident product of claim 17 wherein the housing comprises first and second parts of the product, and the critical area comprises a junction between the first and second parts.

21. The tamper evident product of claim 17 wherein the tamper sensing element is positioned internally of the product.

22. The tamper evident product of claim 17 wherein the tamper sensing element is positioned externally of the product; the tamper sensing element being positioned on the product to extend across the critical area.

23. The tamper evident product of claim 17 wherein the monitored parameter includes light, pressure, tearing, stretching, IR, breakage, increased spacing between the parts or portions of the product.

* * * * *